US012656855B2

(12) United States Patent
Yang

(10) Patent No.: US 12,656,855 B2
(45) Date of Patent: Jun. 16, 2026

(54) POWER MANAGEMENT CHIP, ELECTRONIC DEVICE HAVING THE SAME, AND OPERATING METHOD THEREOF

(71) Applicant: Samsung Electronics Co., Ltd., Suwon-si (KR)

(72) Inventor: Seungwon Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 251 days.

(21) Appl. No.: 18/129,466

(22) Filed: Mar. 31, 2023

(65) Prior Publication Data

US 2024/0103601 A1 Mar. 28, 2024

(30) Foreign Application Priority Data

Sep. 27, 2022 (KR) ........................ 10-2022-0122633
Nov. 24, 2022 (KR) ........................ 10-2022-0159550

(51) Int. Cl.
*G06F 1/00* (2006.01)
*G06F 1/3228* (2019.01)
*G06F 1/3296* (2019.01)

(52) U.S. Cl.
CPC .......... *G06F 1/3296* (2013.01); *G06F 1/3228* (2013.01)

(58) Field of Classification Search
CPC ............................. G06F 1/3296; G06F 1/3228
See application file for complete search history.

(56) References Cited

U.S. PATENT DOCUMENTS

| | | | |
|---|---|---|---|
| 8,176,341 B2 | 5/2012 | Jeyaseelan et al. | |
| 8,555,100 B2 | 10/2013 | Liao | |
| 8,887,171 B2 | 11/2014 | Song et al. | |
| 9,317,096 B2 | 4/2016 | Bircher et al. | |
| 9,386,526 B2 | 7/2016 | Wang et al. | |
| 10,963,038 B2 | 3/2021 | Ramani et al. | |
| 2014/0173298 A1* | 6/2014 | Bircher ................. | G06F 1/3203 |
| | | | 713/300 |
| 2015/0012671 A1* | 1/2015 | Park ........................ | G06F 13/00 |
| | | | 713/323 |
| 2015/0092789 A1* | 4/2015 | Li ........................... | H04L 12/00 |
| | | | 370/437 |
| 2015/0220132 A1 | 8/2015 | An et al. | |
| 2016/0286360 A1* | 9/2016 | Miller ............... | G01C 21/3682 |
| 2017/0351318 A1 | 12/2017 | Gu et al. | |
| 2018/0081420 A1* | 3/2018 | Jones ................... | G06F 1/3243 |
| 2019/0004591 A1 | 1/2019 | Park et al. | |
| 2019/0391630 A1* | 12/2019 | Maki ..................... | G06F 1/3225 |
| 2020/0201417 A1* | 6/2020 | Park ..................... | G06F 1/3275 |

(Continued)

FOREIGN PATENT DOCUMENTS

JP 4073411 B2 4/2008
KR 10-2009-0104768 A 10/2009

(Continued)

*Primary Examiner* — Mohammed H Rehman
(74) *Attorney, Agent, or Firm* — Sughrue Mion, PLLC

(57) ABSTRACT

An operating method of an electronic device is provided. The operating method includes: generating an idle time corresponding to an idle state; selecting a low-power state from among a plurality of low-power states based on the idle time, a time condition, power consumption in the idle state and an entry success rate of a previous low-power state; and entering each of a plurality of devices into a low-power mode according to the low-power state.

20 Claims, 10 Drawing Sheets

(56)　　　　　　　References Cited

U.S. PATENT DOCUMENTS

2022/0317757 A1　10/2022　Rao et al.
2022/0391188 A1*　12/2022　Sayyed ................. H04L 41/082
2023/0410699 A1*　12/2023　Clark ..................... G09G 3/001

FOREIGN PATENT DOCUMENTS

KR　　10-2015-0092590　A　　8/2015
KR　　10-2019-0002248　A　　1/2019
KR　　10-2020-0024670　A　　3/2020
KR　　　20200024670　A　*　3/2020　........... G06F 1/3275

* cited by examiner

| STATE | DEV1 | DEV2 | | DEVn |
|---|---|---|---|---|
| S1 | ACTIVE | ACTIVE | | ACTIVE |
| S2 | ACTIVE | INACTIVE | | INACTIVE |
| S3 | INACTIVE | ACTIVE | | INACTIVE |
| Sk | INACTIVE | INACTIVE | | INACTIVE |

LOW POWER MODE

| SFRD1 |
|---|
| SFRD2 |
| SFRD3 |
| SFRD4 |
| SFRD5 |
| SFRD6 |
| SFRD7 |
| SFRD8 |
| SFRD9 |
| SFRD10 |

FIG. 4

| STATE ID | POWER CONSUMPTION | MINIMUM HOLDING TIME | AVERAGE ENTRY TIME | NUMBER OF SUCCESSES | NUMBER OF FAILURES |
|---|---|---|---|---|---|

FIG. 5

| DEVICE ID | PRIORITY | NUMBER OF SUCCESSES | NUMBER OF FAILURES | NEXT ENTRY INDEX |
|---|---|---|---|---|

FIG. 6

POWER MANAGEMENT CHIP, ELECTRONIC DEVICE HAVING THE SAME, AND OPERATING METHOD THEREOF

CROSS-REFERENCE TO RELATED APPLICATION

This application claims priority to Korean Patent Application Nos. 10-2022-0122633, filed on Sep. 27, 2022, and 10-2022-0159550, filed on Nov. 24, 2022, with the Korean Intellectual Property Office, the disclosures of which are incorporated herein by reference in their entireties.

BACKGROUND

1. Field

The present disclosure relates to a power management chip, an electronic device including the same, and an operating method thereof.

2. Description of Related Art

As a mobile electronic device, such as a smartphone, a television (TV), a tablet personal computer (PC), and the like, become more diverse and provide additional functions and user interface environments, an amount of power consumed by the electronic device increases and battery capacity of the electronic device gradually increases. Accordingly, there is a need to reduce power consumption of the electronic device in order to improve usability.

SUMMARY

One or more example embodiments provide a power management chip reducing power consumption, an electronic device including the same, and an operating method thereof.

One or more example embodiments provide a power management chip having improved performance, an electronic device including the same, and an operating method thereof.

According to an aspect of an example embodiment, an operating method of an electronic device includes: generating an idle time corresponding to an idle state; selecting a low-power state from among a plurality of low-power states based on the idle time, a time condition, power consumption in the idle state and an entry success rate of a previous low-power state; and entering each of a plurality of devices into a low-power mode according to the low-power state.

According to an aspect of an example embodiment, a power management chip includes: a specific function resister configured to store setting data for low-power management; a first memory configured to store a first table including first data for each of a plurality of low-power states; a second memory configured to store a second table including second data corresponding to a low-power state for each of a plurality of devices; and a logic circuit configured to select one of the plurality of low-power states using the setting data, the first data, and the second data, and to identify a low-power entry success rate and priority of each of the plurality of devices according to the low-power state.

According to an aspect of an example embodiment, an electronic device, includes: a system-on-chip; a buffer memory communicably coupled to the-system-on-chip; a display device configured to display data; a touch panel configured to generate touch data; a storage device communicably coupled to the system-on-chip; and a power management chip configured to: select a low-power state, from among a plurality of low-power states, based on power consumption, a history of consumption time, and a history of a low-power entry success rate, of each of the plurality of low-power states, and sequentially controls each of the system-on-chip, the buffer memory, the display device, the touch panel, and the storage device into a low-power mode according to a sequence corresponding to the low-power state.

According to an aspect of an example embodiment, a processor includes: a first device; a second device; a central processing device; and a power management circuit configured to: select a low-power state, from among a plurality of low-power states, based on power consumption, average entry consumption time, and a low-power entry success rate in an idle time; and control a low-power processing operation of the first device, the second device, and the central processing device according to the low-power state.

BRIEF DESCRIPTION OF DRAWINGS

The above and other aspects, features, and advantages will be more clearly understood from the following description of example embodiments, taken in conjunction with the accompanying drawings, in which:

FIG. 4 is a diagram exemplarily illustrating setting data stored in a special function register 131 according to an example embodiment.

FIG. 5 is a diagram exemplarily illustrating an entry of a data table for each low-power state according to an example embodiment.

FIG. 6 is a diagram exemplarily illustrating an entry of a data table for each device according to an example embodiment.

DETAILED DESCRIPTION

Hereinafter, example embodiments will be described with reference to the accompanying drawings. Each example embodiment provided in the following description is not excluded from being associated with one or more features of another example or another example embodiment also provided herein or not provided herein but consistent with the present disclosure. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

A power management chip, an electronic device including the same, and an operating method thereof, may generate an idle time, select a power state to enter, and perform a low-power processing operation for processing devices in a predetermined sequence according to the selected power state. Accordingly, when selecting a power state, a power state that can save the most power may be identified and selected. In particular, a degree of power consumption for each power state may be quantified and compared, in consideration of power consumption for each power state, a history of time consumption until low-power entry, and a history of a low-power entry success rate. In addition, in a low-power processing operation, by determining a processing sequence in consideration of an existing entry success rate of each device, an entry failure cost may be minimized and efficient post-processing may be performed.

Figure 1:
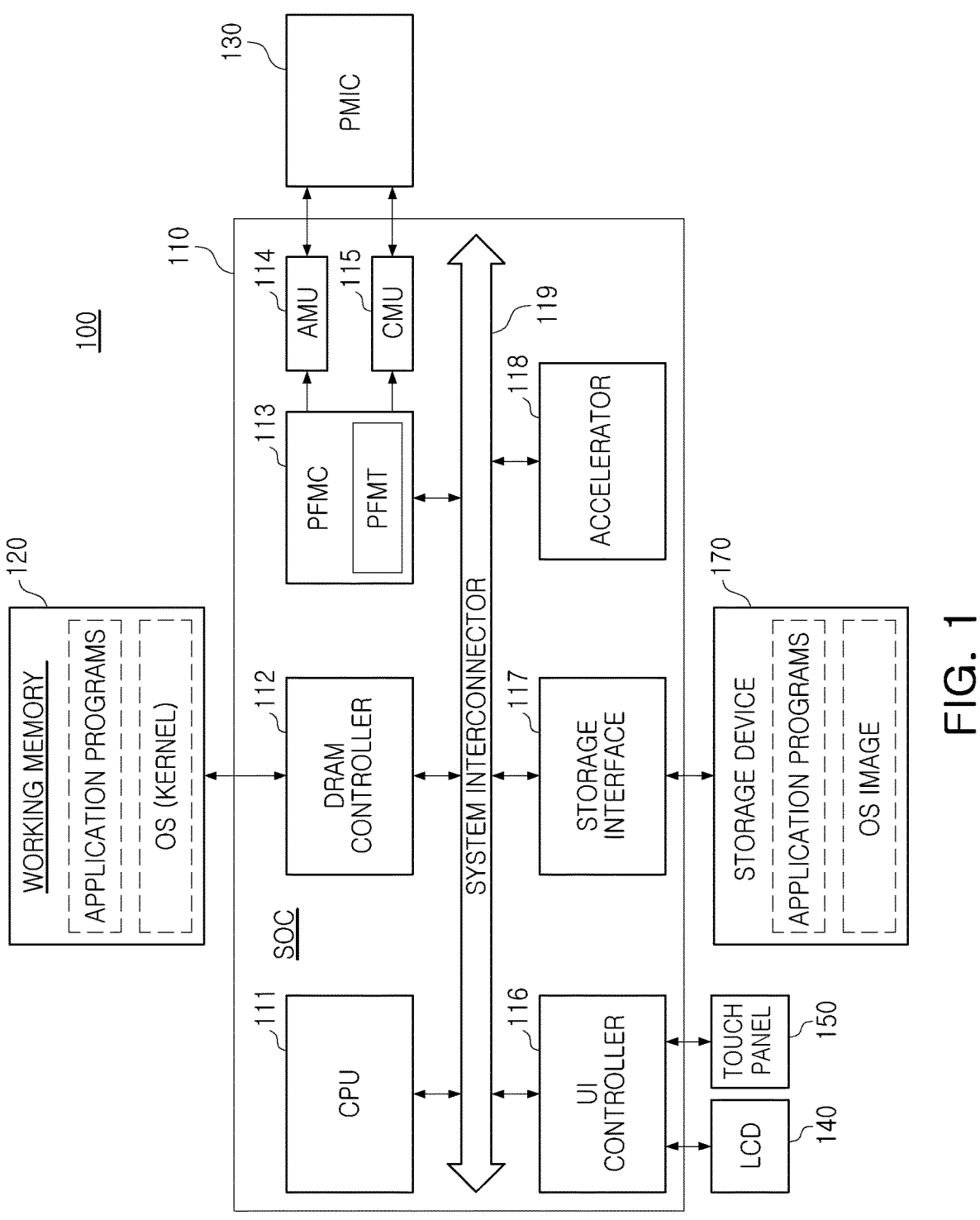
FIG. 1 is a diagram illustrating an electronic device according to an example embodiment.

FIG. 1 is a diagram exemplarily illustrating an electronic device 100 according to an example embodiment. Referring to FIG. 1, the electronic device 100 may include a system-on-chip (SoC) 110, a buffer memory 120, power management chip (PMIC) 130, a display device (LCD) 140, a touch panel 150, and a storage device 170.

The system-on-chip 110 may include at least one processor (CPU) 111, a memory controller 110, a performance controller (PFMC) 113, an activity monitor unit (AMU) 114, a clock management unit (CMU) 115, a user interface controller 116, a storage interface circuit 117, an accelerator 118, and a system bus 119. It should be understood that components of the electronic device 100 are not limited thereto.

The processor 111 may be implemented to execute software (application programs, operating systems, and device drivers) to be executed in the electronic device 100. In addition, the processor 111 may be implemented to execute an operating system (OS) loaded into the buffer memory 120.

In addition, the processor 111 may execute various application programs to be driven based on an operating system (OS). The processor 111 may be implemented as a homogeneous multi-core processor or a heterogeneous multi-core processor. In addition, the processor 111 may be implemented as a computing component having at least two independently drivable processor cores. Here, each of the cores can independently read and execute program instructions. Each of the cores may be composed of a plurality of power domains operated by independent driving clocks and independent driving voltages. In addition, a driving voltage and a driving clock signal supplied to each of the multi-cores may be blocked or connected in units of cores. Cutting off the driving voltage and clock signal provided to each power domain from a specific core may be referred to as hot plug-out, and providing the driving voltage and clock to a specific core may be referred to as hot plug-in.

In addition, a frequency of the driving clock and a level of the driving voltage provided to each power domain may vary according to a processing load of each of the cores. That is, each of the cores may be controlled in a dynamic voltage and frequency scaling (DVFS) method in which the frequency of the driving clock provided to a corresponding power domain or the level of the driving voltage increases as the time required to process tasks increases. Hot plug-in and hot plug-out may be performed with reference to an operating frequency of a driving voltage and a driving clock of a processor 111 adjusted through DVFS. A kernel of the operating system (OS) may monitor the number of tasks in a run queue, and control the driving voltage of the processor 111 and the driving clock of the processor 111 at specific time intervals. In addition, the kernel of the operating system (OS) may control hot plug-in or hot plug-out of the processor 111 by referring to the monitored information.

The memory controller 112 may be implemented to provide interfacing between a buffer memory 120 and a system-on-chip 110. In addition, the memory controller 112 may access the buffer memory 120 according to a request of the processor 111 or another functional block (Intellectual Property: IP). For example, a functional block, such as an IP block, may include circuitry to perform specific functions, and may have a design that includes a trade secret. For example, the memory controller 112 may write data to the buffer memory 120 according to a write request of the processor 111. In addition, the memory controller 112 may read data from the buffer memory 120 according to a read request of the processor 111 and transfer the data to the processor 111 or the storage interface circuit 117 through the system bus 119.

When booting, the buffer memory 120 may load an operating system (OS) or application programs. For example, when the electronic device 100 boots, an OS image stored in the storage device 170 is loaded into the buffer memory 120 based on a booting sequence. All input/output operations of the electronic device 100 may be supported by the operating system (OS). Similarly, application programs may be loaded into the buffer memory 120 to be selected by a user or to provide basic services.

The buffer memory 120 may be used as a buffer memory for storing image data provided from an image sensor such as a camera. The buffer memory 120 may be a volatile memory such as static random access memory (SRAM) or dynamic random access memory (DRAM) or a non-volatile memory such as phase-change memory (PRAM), magnetoresistive random-access memory (MRAM), resistive random-access memory (ReRAM), ferroelectric random-access memory (FRAM), and NOR flash memory. The performance controller 113 may be implemented to adjust operating parameters of the system-on-chip 110 according to a control request provided from a kernel of an operating system (OS). For example, the performance controller 113 may adjust a level of Dynamic Voltage Frequency Scaling (DVFS) to increase the performance of the system-on-chip 110. In addition, the performance controller 113 may control a driving mode of a multi-core processor such as Big-.LITTLE of the processor 111 according to a request of the kernel. In this case, the performance controller 113 may include a performance table (PFMT) for setting an operating frequency of a driving voltage and a driving clock therein. The performance controller 113 may control an AMU 114 and a CMU 115 connected to the power management chip 130 to provide specified driving voltages and driving clocks to respective power domains.

The user interface controller 116 may be implemented to control user input and output from user interface devices. For example, the user interface controller 116 may control display of a keyboard screen, or the like, for inputting data on the display device (LCD) 140 under the control of the processor 111. In addition, the user interface controller 116 may control the display device 140 to display data requested by the user. The user interface controller 116 may decode data provided from a user input device, such as a touch panel 150, into user input data.

The storage interface circuit 117 may be implemented to access the storage device 170 according to a request of the processor 111. That is, the storage interface circuit 117 provides an interface between the system-on-chip 110 and the storage device 170. Data processed by the processor 111 may be stored in the storage device 170 through the storage interface circuit 117. In addition, data stored in the storage device 170 may be provided to the processor 111 through the storage interface circuit 117. In an example embodiment, the storage interface circuit 117 may be implemented with at least one of NVM Express (NVMe), Peripheral Component Interconnect Express (PCIe), Serial Advanced Technology Attachment (SATA), Small Computer System Interface (SCSI), and Serial Attached SCSI (SAS), Universal Storage Bus (USB), Attached SCSI (UAS), Internet Small Computer System Interface (iSCSI), Fiber Channel, and Fiber Channel over Ethernet (FCoE).

The storage device 170 may be provided as a storage medium of the electronic device 100. The storage device 170 may store application programs, operating system images, and various data. The storage device 170 may be provided as memory cards (MultiMediaCard (MMC), Embedded MMC (eMMC), Secure Digital (SD), MicroSD, and the like). The storage device 170 may include a NAND flash memory, a vertical NAND flash memory, a NOR flash memory, a Resistive Random Access Memory (RRAM), a PRAM, an MRAM, an FRAM, or a spin transfer torque random access memory (STT-RAM). In another example embodiment, the storage device 170 may be a built-in memory provided inside the system-on-chip 110.

The accelerator 118 may be provided as a separate functional block (IP) to improve a processing speed of multimedia or multimedia data. For example, the accelerator 118 may be provided as a functional block (IP) for improving processing performance of text, audio, still images, animation, video, 2D data, or 3D data. In an example embodiment, accelerator 118 may be implemented to accelerate a low-power management operation. The accelerator 118 may accelerate an entry into the low-power mode using power management history by driving a low-power acceleration module.

The system bus 119 is a bus for providing an on-chip network inside the system-on-chip 110. For example, the system bus 119 may include a data bus, an address bus, and a control bus. The data bus is a path along which data moves. Mainly, a memory access path to the buffer memory 120 or the storage device 170 will be provided. The address bus provides an address exchange path between functional blocks (IPs). The control bus provides a path for transferring control signals between functional blocks (IPs). However, the configuration of the system bus 119 is not limited thereto and may further include a mediation circuit for efficient management.

The power management chip 130 (PMIC) may be implemented to manage power provided to each of internal components of the electronic device 100. The power management chip 130 may be implemented to provide the system-on-chip 110 with power in response to a power control signal. In particular, when entering a low-power mode, the power management chip 130 may be implemented to select an optimal low-power state from among a plurality of low-power states using power management history. In an example embodiment, the power management chip 130 may select the low-power state of the OS based on power consumption and an existing low-power state entry success rate/entry consumption time, in the corresponding low-power state among low-power states having a minimum required time less than a predetermined standby time. In an example embodiment, the power management chip 130 may determine and calculate whether entry into the low-power state is possible based on the existing low-power state entry success rate and set priority for the corresponding low-power state for each device.

In addition, the power management chip 130 may select an optimal low-power state to enter the low-power state in consideration of scheduled time to be consumed in the low-power state, an existing actual consumption time, a scheduled power consumption amount, and an existing entry success rate. In addition, when entering the low-power state, the power management chip 130 may process the devices in a predetermined sequence considering the existing entry success rate and set priority of each device. For example, the power management chip 130 may determine a low-power processing sequence of the system-on-chip 110, the buffer memory 120, the display device 140, the touch panel 150, and the storage device 170, based on the low-power entry success rate and set priority for each device.

Although the power management chip 130 illustrated in FIG. 1 is disposed outside the system-on-chip 110, it should be understood that example embodiments are not limited thereto. The power management chip may be provided as a functional block inside the system-on-chip 110 including a power management unit (PMU).

A related electronic device may select a low-power state having a minimum required time less than a scheduled standby time in the OS in order to minimize unnecessary power consumption, and check and process whether or not the low-power state of each device is possible in a fixed sequence managed by the OS. The electronic device may enter a low-power state guaranteeing a predetermined standby time. However, this standby time is not optimal.

On the other hand, the electronic device 100 according to an example embodiment may enter the low-power state while guaranteeing a predetermined standby time by selecting a low-power state of the OS using a history of past low-power states and processing the low-power state of each device. In addition, when the electronic device 100 according to an example embodiment enters a low-power state, effective power reduction may be expected based on power to be consumed in the corresponding low-power state, an existing entry success rate, and consumption time. In addition, even if the electronic device 100 according to an example embodiment fails to enter the low-power state, it can more quickly determine whether entry is impossible by processing based on the existing entry success rate.

Figures 2, 3:
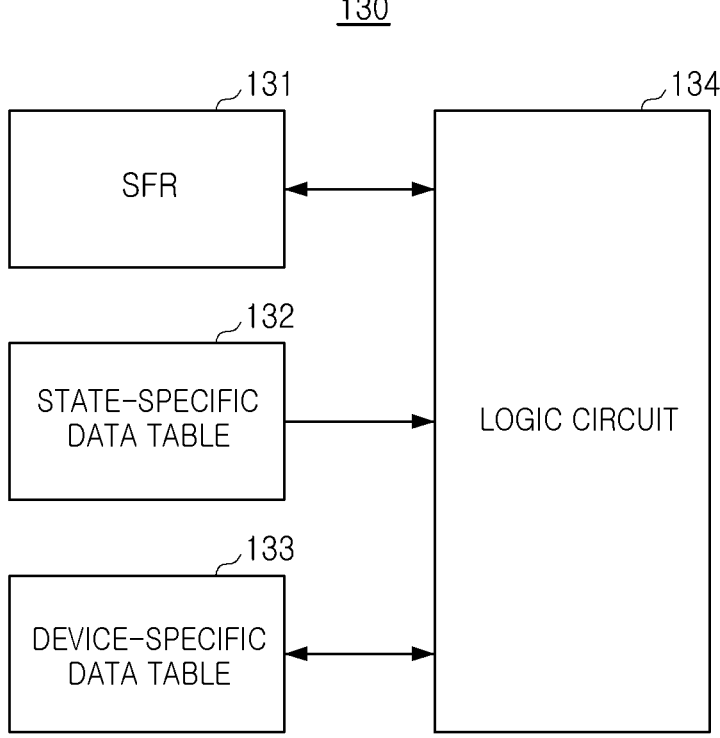
FIG. 2 is a diagram exemplarily illustrating a low-power state according to an example embodiment.
FIG. 3 is a diagram exemplarily illustrating a power management chip 130 according to an example embodiment.

FIG. 2 is a diagram exemplarily illustrating a low-power state according to an example embodiment. Referring to FIG. 2, an electronic device 100 may enter a low-power mode according to one of a plurality of low-power states (S1 to Sk, where k is an integer of 2 or greater) corresponding to whether each of the plurality of devices (DEV1 to DEVn, where n is an integer greater than or equal to 2) is active or inactive. Here, each of the low-power states S1 to Sk may be referred to as a sleep state. In general, sleep states include idle and power-gated states.

The power management chip may not only manage low-power according to whether a device is active or inactive, but also manage low-power according to whether an OS or application driven in an active state of each device is executed or not executed.

FIG. 3 is a diagram exemplarily illustrating a power management chip 130 according to an example embodiment. Referring to FIG. 3, the power management chip 130 may include a special function register (SFR) 131, a state-specific data table 132, a device-specific data table 133, and a logic circuit 134.

The special function register (SFR) 131 may be implemented to store setting data for low-power management.

The state-specific data table (first table) 132 may store state-specific data corresponding to each of a plurality of low-power states.

The device-specific data table (second table) 133 may store device-specific data according to the selected low-power state.

The logic circuit 134 may be implemented to select a low-power state and perform an operation for entering an optimal low-power mode according to the selected low-power state.

The power management chip 130 according to an example embodiment may use a low-power state selection technique for selecting the same based on power consumption in a low-power state, a low-power entry success rate, and a time to consumed until entry of the low-power state. In an example embodiment, the power management chip 130 may determine a low-power processing sequence for adjusting a low-power processing sequence based on the entry success rate into a low-power state and set priority for each device. In an example embodiment, the power management chip 130 may determine a state in which power can be maximally saved when an idle time is given, and update the determined state to the special function register (SFR) 131. In this case, by digitizing all states based on power consumption, an entry consumption time, and an entry success rate of each state, the power management chip 130 may compare each state and determine an optimal power state based on the comparison.

In addition, the power management chip 130 may determine the order of devices to be processed based on the low-power entry success rate and set priority for each device, and update the device-specific data table 133 for each device. The power management chip 130 may determine a sequence of devices to be processed based on the low-power entry success rate and set priority for each device, and update the sequence to the device-specific data table 133 for each device. The power management chip 130 may execute a low-power management module according to the above-described low-power management operation. The low-power management module may update the respective tables 132 and 133 based on the power processing result.

FIG. 4 is a diagram exemplarily illustrating setting data stored in a special function register 131 according to an example embodiment. Referring to FIG. 4, the special function register 131 may store a plurality of setting data SFRD1 to SFRD10.

The first setting data SFRD1 may store a value for setting whether to configure the state-specific data table 132 for each low-power state and the device-specific data table 133 for each device in an internal memory or an external memory. In an example embodiment, the state-specific data table 132 for each low-power state and the device-specific data table 133 for each device are configured in an external memory, and the setting data SFRD1 includes a start address in a region of the external memory to be used and the number of entries in each table.

The second setting data SFRD2 may indicate a scheduled idle time. For example, an optimal low-power state may be selected based on the set idle time and the low-power state table 132. The third setting data SFRD3 may indicate a reference number of average consumption times to be used for selecting a low-power state. For example, the average consumption time may be calculated when the number of successes is greater than the reference number.

The fourth setting data SFRD4 may indicate a reference number of entry success rates to be used for selecting a low-power state. For example, when the number of successes+the number of failures is greater than the reference number, an entry success rate may be calculated. The fifth setting data SFRD5 may indicate a correction value to be used for selecting a low-power state. The sixth setting data SFRD6 may indicate a current operating state and a selected low-power state.

The seventh setting data SFRD7 may indicate a time consumed to enter a low-power state. Start/end of an operation for measuring and updating the same may be indicated. The eighth setting data SFRD8 may indicate a reference number of times to start calculating a device processing sequence. For example, when the sum of the number of successes+the number of failures of all devices is greater than the reference number, the success rate may be calculated. The ninth setting data SFRD9 may indicate whether or not to use priorities for calculating the device processing sequence.

The tenth setting data SFRD10 may indicate an entry index of a first processing sequence among devices. For example, when the sum of the number of successes+the number of failures is less than or equal to the reference number, an entry index of the first processing sequence may be set. In an example embodiment, success or failure of entry into the low-power state, may be reflected through a bit-map or the like. In addition, internal data and each table (including the state-specific data table 132 and the device-specific data table 133) may be initialized.

FIG. 5 is a diagram exemplarily illustrating an entry of a data table 132 according to an example embodiment. The state-specific data table 132 may include an entry for each low-power state.

The state ID is a unique number for distinguishing a low-power state. Power consumption is an amount of power to be consumed in each state. A power consumption value is a value calculated based on an energy model. The power consumption value may be included in a binary of a low-power management module SW or calculated by the SW. A minimum holding time is a minimum holding time of the state. The minimum holding time may be included in the SW binary or calculated by SW. An average entry consumption time is a cumulative average consumption time until an entry. The average entry consumption time may be updated by a power management chip 130 whenever a corresponding state is selected and entered. The number of successes is a cumulative number of successes. The cumulative success count may be updated by the power management chip 130. The number of failures is a cumulative number of failures. The cumulative number of failures may be updated by the power management chip 130.

FIG. 6 is a diagram exemplarily illustrating an entry of a data table 133 according to an example embodiment. The device-specific data table 133 may include an entry for each device according to a selected low-power state.

A device ID is a unique number for identifying a device. Priority is processing priority. The priority may be set as needed. The priority may be used as a sequencing factor. The number of successes is a cumulative number of successes. The number of successes may be used as a sequencing factor. The number of failures is a cumulative number of failures. The number of failures can be used as a sequencing factor. A next-sequence entry index determines a device processing sequence according to the priority and entry success rate, and indicates a next-sequence device entry index of the corresponding device. If the entry corresponds to a first device, the next sequence entry index is 0.

Figure 7:
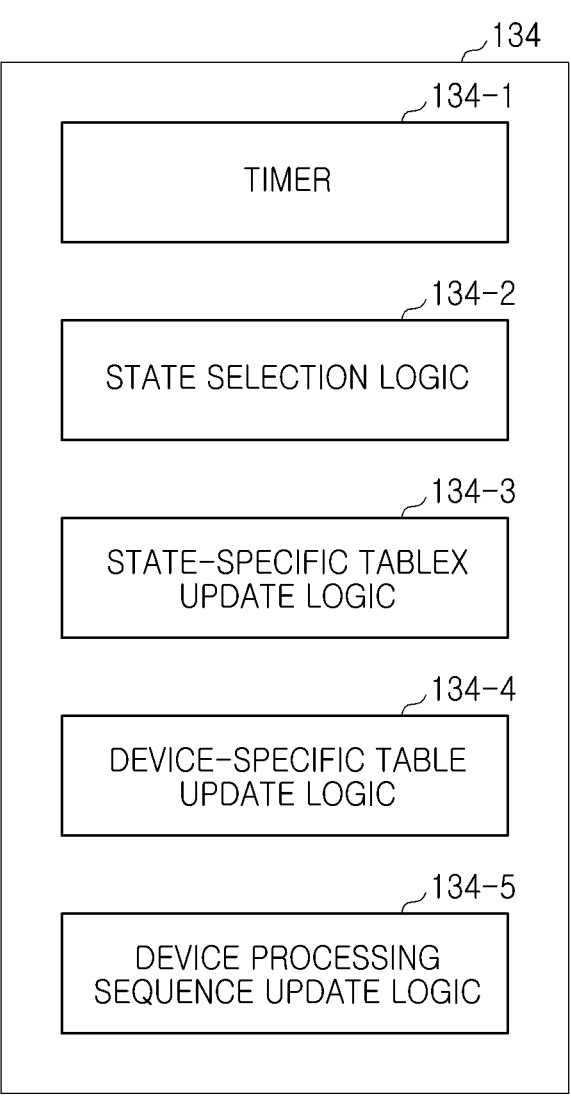
FIG. 7 is a diagram exemplarily illustrating a logic circuit according to an example embodiment.

FIG. 7 is a diagram exemplarily illustrating a logic circuit 134 according to an example embodiment. Referring to FIG. 7, the logic circuit 134 may include a timer 134-1, a low-power state selection logic 134-2, a state-specific data table update 134-3, a device-specific data table update logic 134-4, and a device processing sequence update logic 134-5.

The timer 134-1 may be implemented to measure a time consumed to enter a low-power state. The timer 134-1 may be started according to a set value of the special function register 131.

The low-power state selection logic 134-2 may be implemented to select a low-power state based on a time condition, power consumption, and a success rate of the table. The low-power state selection logic 134-2 may start an operation thereof according to a set value of the special function register 131.

The state-specific data table update logic 134-3 for each low-power state may be implemented to calculate an average consumption time of a state entry corresponding to the measured value when the timer 134-1 ends, and update related information. When it is determined whether to enter the low-power state, the state-specific data table update logic 134-3 for each low-power state may update an entry success rate of the corresponding state entry. When the value of the number of successes/number of failures exceeds an expression range, the data table update logic 134-3 for each low-power state may be updated by right-shifting once.

The device-specific data table update logic 134-4 may be implemented to update the number of successes/failures of a corresponding entry when success or failure of a device is added by the special function register 131. When a value of the number of successes/number of failures exceeds the expression range, the data table update logic 134-4 for each device may update by right-shifting once.

After the state entry is updated, the device processing sequence update logic 134-5 may be implemented to calculate a device processing sequence based on table values for each device, and update the next sequence entry index of each entry.

Figure 8:
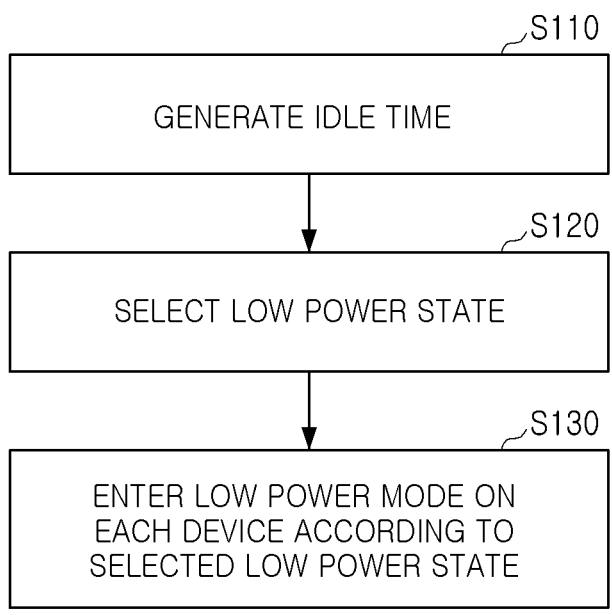
FIG. 8 is a flowchart exemplarily illustrating a method of operating an electronic device according to an example embodiment.

FIG. 8 is a flowchart exemplarily illustrating a method of operating an electronic device according to an example embodiment. Referring to FIG. 8, the electronic device 100 may operate as follows.

An idle time may occur in the electronic device 100 (S110). A power management module of the power management chip 130 may select one low-power state from among a plurality of low-power states (S120). Here, the low-power state may be selected in consideration of an entry success rate in an existing low-power state and the idle time. Each device may enter a low-power mode according to a low-power state selected under the control of the power management chip 130 (S130).

In an example embodiment, a low-power management module may be implemented in terms of software, hardware, or firmware. In an example embodiment, the low-power management module may be set using a special function register. In an example embodiment, a low-power state may be selected based on power consumption, a low-power entry success rate, and a low-power consumption time. In an example embodiment, the low-power entry success rate may be calculated using the number of successes of entries and the number of failures of entries of each of the plurality of devices in the low-power state.

In an example embodiment, the electronic device 100 may include a first table having first data corresponding to each of a plurality of low-power states and a second table having second data corresponding to each of a plurality of devices according to a selected low-power state, wherein the first data may include power consumption, a minimum holding time, an average entry time, and the number of successes or number of failures, and the second data may include priority, the number of successes, the number of failures, or a next entry index. In an example embodiment, after entering the low-power mode, the first table and the second table may be updated. In an example embodiment, a device having the highest entry failure probability among a plurality of devices may preferentially enter the low-power mode. In an example embodiment, the entry failure probability of each of the plurality of devices may be updated, and device processing priority may be determined according to the entry failure probability.

Figure 9:
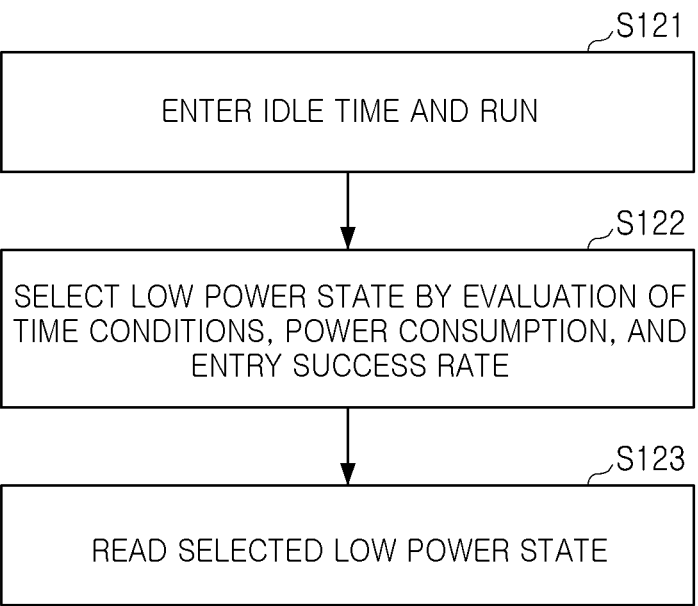
FIG. 9 is a flowchart exemplarily illustrating a method of selecting a low-power state of an electronic device 100 according to an example embodiment.

FIG. 9 is a flowchart exemplarily illustrating a method of selecting a low-power state of the electronic device 100 according to an example embodiment.

The low-power management module of the power management chip 130 (see FIG. 1) may set a scheduled idle time through a special function register (SFR) 131, and start a low-power management operation (S121). Here, the low-power management module may be implemented using software, hardware or firmware, or a combination thereof. A state selection logic 134-2 of the low-power management module may select an optimal low-power state by evaluating a time condition, power consumption, and a success rate, and update the selected low-power state to the special function register (SFR) 131 (S122). This low-power state selection operation process may be reflected in an operating state field of the special function register (SFR) 131. A specific example of selecting the low-power state is as follows. Among states in which a minimum holding time is shorter than the scheduled idle time, a state in which power consumption*(scheduled idle time−average entry consumption time)*correction value*entry success rate value is the largest may be selected. Here, the average entry consumption time may be applied when the number of successes is greater than a reference number of special function registers (SFR) 131. In addition, the entry success rate may be applied when the number of successes+the number of failures is greater than the reference number of the special function register (SFR) 131.

Thereafter, the low-power management module checks whether the selection is completed through the operating state field of the special function register (SFR) 131, and then reads a value thereof from the selected state field (S123). When the selected state field of the low-power management module is read, the IP internal timer 133-2 may start operating.

Figure 10:
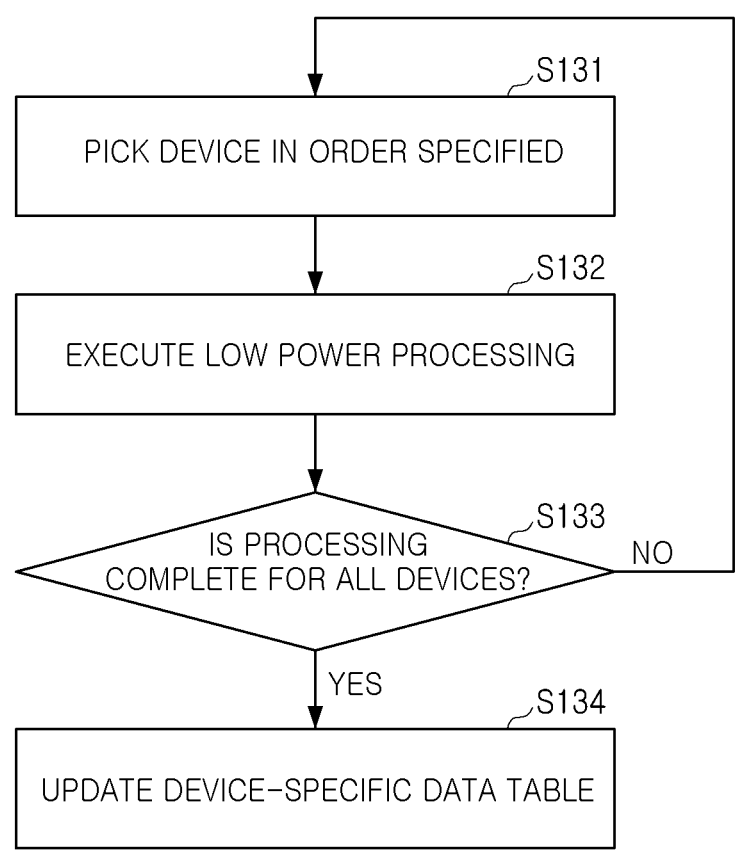
FIG. 10 is a flowchart exemplarily illustrating an entering a low-power state of the electronic device 100 according to an example embodiment.

FIG. 10 is a flowchart exemplarily illustrating entering a low-power mode of the electronic device 100 according to an example embodiment. Referring to FIG. 10, entry into the low-power mode may proceed as follows.

A low-power management module of a power management chip 130 may read an entry index of a first processing sequence from a special function register (SFR) 131 (S131). The low-power management module may perform low-power processing of a device (S132). The low-power management module may read an entry corresponding to a table for each device by checking a value of a next sequential index field. The low-power management module may repeat the above-described process for all devices (S133). When there is a device that fails to enter a low-power mode, a failed entry index and success and whether there a success has occurred are recorded in the special function register (SFR) 131, and the device may enter a resume process can be entered. When low-power processing for all devices is completed, the low-power management module may update the special function register (SFR) 131 to determine whether a success has occurred (S134). When the success or failure of processing for a device is recorded in the special function register (SFR) 131, an operation of the internal timer 134-1 may be terminated. The data table update logic for each device 134-3 may update the number of successes or failures of the device according to success or failure. When an operation of the timer 134-1 ends, the data table update logic 134-3 for each low-power state of the IP may check the consumed time, and update the number of successes and the number of failures of the entry according to the average consumed time of the entry corresponding to the consumed time and whether or not device processing is successful.

After the number of successes or failures of the device is updated, when the sum of the number of successes+the number of failures of the all devices is greater than the reference number set in the special function register (SFR) 131, the device processing sequence update logic 134-5 may calculate a processing sequence of the device, and update the next sequence entry index of each entry corresponding to the calculated processing sequence.

The electronic device 100 may extract data corresponding to the above-described low-power processing process of the low-power management module. Data updated and used in the above-described low-power processing process may be extracted through memory access. Accordingly, the entire process of low-power processing can be traced and all data may be extracted as needed. Data extracted in this manner may be used for analysis of low-power operation.

Example embodiments are applicable to a Real Time Operating System (RTOS). The RTOS assigns a fixed priority to every process. The scheduler arranges these allocated processes in a ready queue according to their priority.

Figure 11:
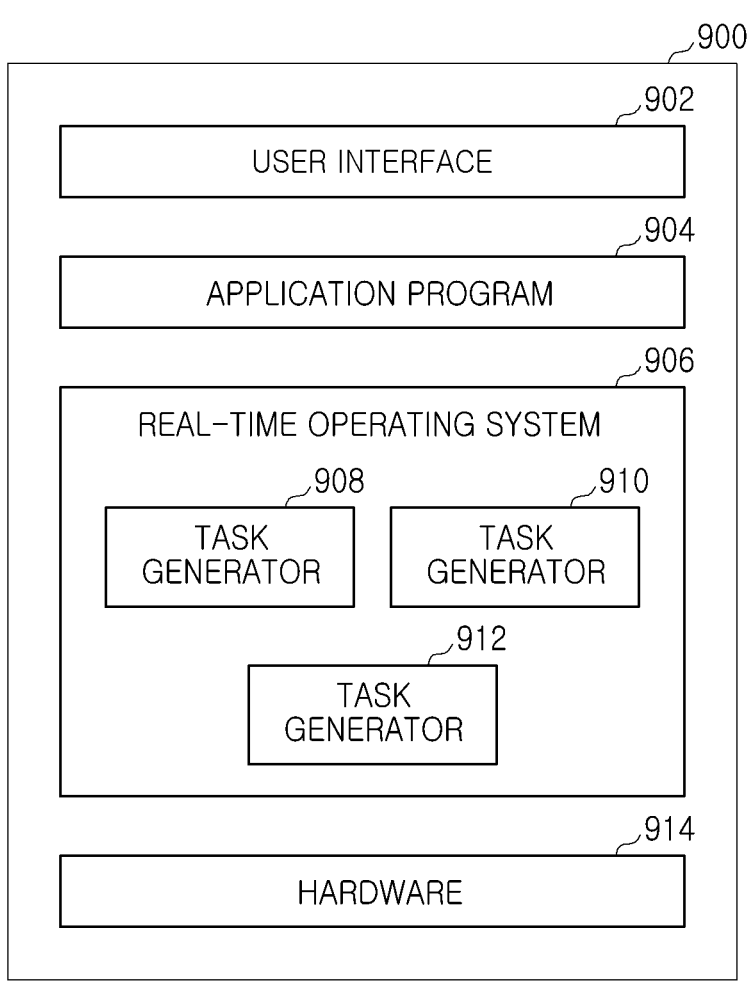
FIG. 11 is a diagram exemplarily illustrating a computing system according to an example embodiment.

FIG. 11 is a diagram exemplarily illustrating a computing system according to an example embodiment. Referring to FIG. 11, a computing system 900 may include a user interface layer 902, an application program layer 904, an RTOS system 906, and hardware 914. For example, the hardware 914 may include one or more processors and one or more memories.

The RTOS system 906 may include a task generator 908, a task scheduler 910, and a task synchronizer 912. The task generator 908 is configured to generate a plurality of tasks using two level stacking methods. The task scheduler 910 moves a stack pointer from a first level stack to a second level stack, and determines whether the first task is preempted. When the first task is not preempted, the second-level stack is allocated to the first task in a second state, and it is determined whether the first task gives up control from the second state and is waiting for a resource through a task scheduler, and a first task to be executed is scheduled. When the first task abandons itself and provides a second level stack for use by the second task, the task synchronizer 912 moves the stack pointer from the second level stack back to the first level stack.

Although the above-described low-power management has been described based on an RTOS, it may be applied to all environments including a power management function according to example embodiments. In some cases, weights or other factors may be added or deleted from the calculation formula. Accordingly, the configuration of the table entry may also be taken flexibly. When power consumption of each device is stored as digital data that may be accessed by the entire system may, the digital data can be used for calculation elements and extracted into various and meaningful data through additional processing.

Figure 12:
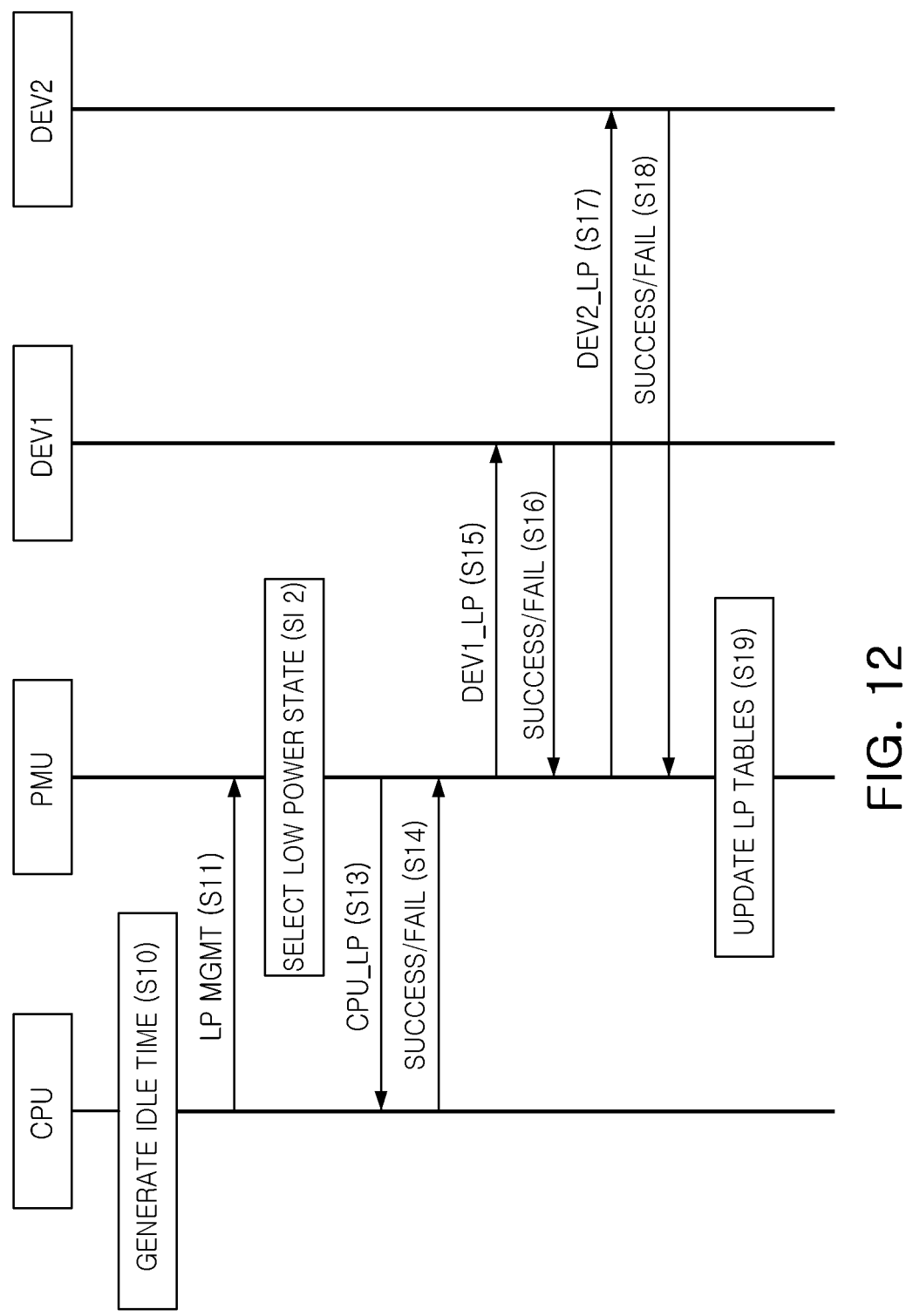
FIG. 12 is a ladder diagram illustrating entering a low-power mode of a processor according to an example embodiment.

FIG. 12 is a ladder diagram illustrating a low-power management operation of a processor according to an example embodiment. Referring to FIG. 12, a low-power management operation of a processor may proceed as follows.

The CPU may generate an idle time based on various environmental data (S10). Thereafter, the CPU may request low-power state management (LP MGMT) according to the idle time from the PMU (S11). The PMU may select an optimal low-power state from among low-power states using low-power tables according to the LP MGMT request (S12). The PMU may output a CPU low-power control signal (CPU_LP) corresponding to the optimally selected state to the CPU (S13). The CPU may feedback success/failure data on whether to enter the low-power mode according to the CPU low-power control signal (CPU_LP) to the PMU (S14). The PMU may output a first device low-power control signal DEV1_LP corresponding to the optimally selected state to the first device DEV1 (S15). The first device DEV1 may feedback success/failure data on whether to enter the low-power mode according to the first device low-power control signal DEV1_LP to the PMU (S16). The PMU may output a second device low-power control signal DEV2_LP corresponding to the optimally selected state to the second device DEV2 (S17). The second device DEV2 may feedback success/failure data on whether to enter the low-power mode according to the second device low-power control signal DEV2_LP to the PMU (S18).

Thereafter, the PMU may update the low-power table based on success/failure data of the CPU, DEV1, and DEV2 (S19).

The low-power management technique may be applied to mobile devices.

Figure 13:
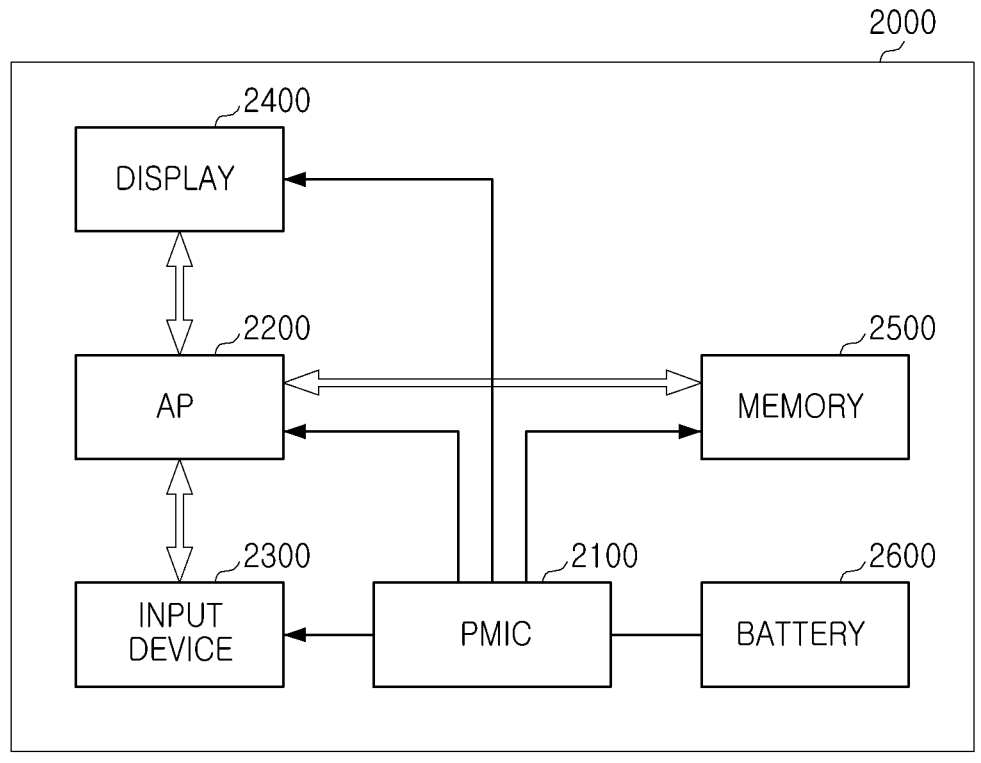
FIG. 13 is a diagram exemplarily illustrating a mobile device according to an example embodiment.

FIG. 13 is a diagram exemplarily illustrating a mobile device 2000 according to an example embodiment. Referring to FIG. 13, the mobile device 2000 may include a power management integrated circuit (PMIC) 2100, an application processor (AP) 2200, an input device 2300, a display device 2400, and a memory device 2500, and a battery 2600.

The power management chip 2100 may receive power from the battery 2600, and supply and manage power to the AP 2200, the input device 2300, the display device 2400, or the memory device 2500. The mobile device 2000 may include at least one power management chip 2100. In an example embodiment, the mobile device 2000 may supply power to the AP 2200, the input device 2300, the display device 2400, and the memory device 2500 using one power management chip 2100. In another example embodiment, the mobile device 2000 may include a plurality of power management chips 2100 for individually supplying power to each of the AP 2200, the input device 2300, the display device 2400, and the memory device 2500.

As described in FIGS. 1 to 11, the power management chip 2100 may be implemented to perform low-power management using a low-power table (data table for each state, data table for each device) storing success/failure information of existing low-power states.

The AP 2200 may control an overall operation of the mobile device 2000. For example, the AP 2200 may display data stored in the memory device 2500 through a display device 2400 according to an input signal generated by the input device 2300. The input device 2300 may be implemented as a pointing device such as a touch pad or a computer mouse, a keypad, or a keyboard. The AP 2200 may monitor activity (performance/bottleneck) for each memory layer by executing a DVFS module, and change a frequency/voltage of the memory layer according to the monitoring result.

The memory device 2500 may be implemented to store various data used by at least one component of the mobile device 2000, e.g., software, and input data or output data for commands related thereto. The memory device 2500 may include volatile memory or non-volatile memory. In an example embodiment, the memory device 2500 may store information regarding task performance conditions corresponding to various tasks. For example, the mobile device 2000 may correspond and store task performance conditions for each user identification information. The memory device 2500 may store load control information for various operations of the mobile device 2000.

The battery 2600 may be implemented as a rechargeable secondary battery. For example, the battery 2600 may be charged using power received through a wired interface circuit or power received through a wireless charging circuit.

The wired interface circuit may transfer power from an external power source to the power management chip 2100 by providing a wired connection to the external power source. The wired interface circuit may include a connector for connecting a cable for providing power or a cable for providing power and a connector for connecting the cable to an external power source. For example, the wired interface circuit may be implemented with various universal serial bus (USB)-type connectors. However, it should be understood that the type of connector is not limited. If DC power is received from an external power source, the wired interface circuit may transfer the received DC power to the power management chip 2100, or convert a magnitude of a voltage to transfer the power to the power management chip 2100. On the other hand, when AC power is received from an external power source, the wired interface circuit converts the same into DC power or converts the magnitude of the voltage to transfer the power to the power management chip 2100.

A wireless charging circuit may be implemented in a manner defined in the Wireless Power Consortium (WPC) standard (or Qi standard) or in a manner defined in the Alliance for Wireless Power (A4WP) standard (or air fuel alliance (AFA) standard). The wireless charging circuit may include a coil in which induced electromotive force is generated by a magnetic field whose size changes with time formed around it. The wireless charging circuit may include at least one of a receiving coil, at least one capacitor, an impedance matching circuit, a rectifier, a DC-DC converter, or a communication circuit. The communication circuit may be implemented as an in-band communication circuit of an on/off keying modulation/demodulation method, or may be implemented as an out-of-band communication circuit (e.g., a Bluetooth Low Energy (BLE) communication module). According to various example embodiments, the wireless charging circuit may also receive a radio frequency (RF) wave beam-formed based on an RF scheme.

In an example embodiment, the wired interface circuit or wireless charging circuit may be connected to a charger. The battery 2600 may be charged using power adjusted by a charger. The charger or converter may be implemented as an independent element from the power management chip 2100, or may be implemented as at least a portion of the power management chip 2100. The battery 2600 may transfer stored power to the power management chip 2100. Power through the wired interface circuit or through the wireless charging circuit may be transferred to the battery 2600, or the power management chip 2100.

Example embodiments may be applied to a neural network computing system.

Figure 14:
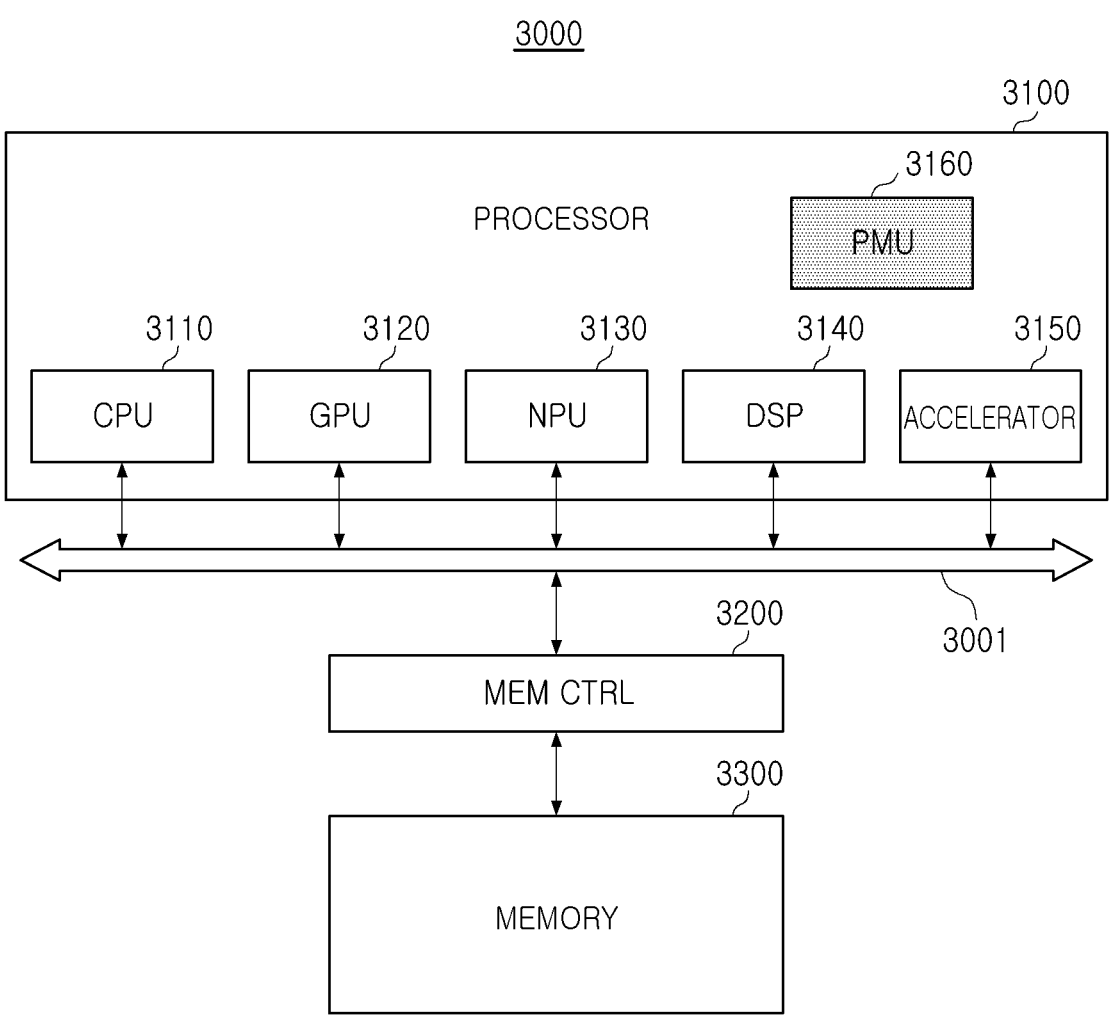
FIG. 14 is a diagram illustrating a neural network computing system according to an example embodiment.

FIG. 14 is a diagram illustrating a neural network computing system 3000 according to an example embodiment. Referring to FIG. 14, the neural network computing system 3000 may execute a neural network model. The neural network model is a model of a learning method and may refer to a model capable of accurately recognizing and discriminating an object or specific information from various user data such as voice, image, and video.

The neural network computing system 3000 may be a mobile system such as a mobile phone, a smartphone, a tablet personal computer (PC), a wearable device, a healthcare device, or an Internet of Things (IoT) device. However, the neural network computing system 3000 is not necessarily limited to a mobile system, and may be used in vehicle equipment such as a personal computer, a laptop computer, a server, a media player, or an automotive device such as a navigation device.

The neural network computing system 3000 may include a system bus 3001, a processor 3100, a memory controller 3200, and a memory device 3300. The system bus 3001 may support communication between the processor 3100, the memory controller 3200, and the memory device 3300.

The processor 3100 may perform a neural network calculation using data stored in the memory device 3300. For example, the neural network calculation may include reading data and weights for each node included in the neural network model, performing a convolution calculation on the data and weights, and storing or outputting the calculation result. In addition, the processor 3100 may include a Central Processing Unit (CPU) 3110, a Graphic Processing Unit (GPU) 3120, a Neural Processing Unit (NPU) 3130, a Digital Signal Processor (DSP) 3140, an accelerator 3150, and a power supply management unit (PMU) 3160.

The CPU 3110 may be a high versatile computing device. The GPU 3120 may be a computing device optimized for parallel computation such as graphics processing. The NPU 3130 is a computing device, optimized for neural network calculating, and may include logic blocks for executing unit calculating operations mainly used in neural network calculating, such as convolution. The DSP 3140 may be a computing device optimized for real-time digital processing of analog signals. The accelerator 3150 may be a computing device for quickly performing a specific function. When the processor 3100 executes a neural network model, various hardware devices may operate together. For example, in order to execute a neural network model, not only the NPU 3130, but also heterogeneous computing devices such as the CPU 3110 and the GPU 3120 may operate together. In addition, the memory controller 3200 and the system bus 3001 may operate to read input data of the neural network model and store output data.

FIG. 14 illustrates a diagram exemplarily illustrating a hierarchical structure of the neural network computing system according to an example embodiment. A neural network computing system may include a hardware layer (HW), a system software layer (SW), and an application layer (APP). The hardware layer HW is the lowest layer of the neural network computing system, and may include hardware devices such as a system bus, a processor, and a memory controller. The processor may include heterogeneous computing units, such as CPUs, GPUs, NPUs, DSPs, and other accelerators. The system software layer SW may manage hardware devices of the hardware layer HW, and provide an abstracted platform.

For example, the system software layer SW may drive a kernel such as Linux. The system software layer SW may include DVFS and a neural network model executor. The DVFS may determine operating frequencies of hardware devices for each memory layer using microarchitectural information. The neural network model executor may execute the neural network model using hardware devices operating at an operating frequency determined by DVFS. In addition, the neural network model executor may output an actual execution time of the neural network model as a result of executing the neural network model. In addition, the system software layer SW may be driven by a processor. For example, the system software layer SW may be driven by a CPU. However, it should be understood that the computing device on which the system software layer SW can be driven is not limited to the CPU. The application layer APP may be executed on the system software layer SW, and may include a plurality of neural network models and other applications. For example, other applications may include a camera application.

The power management unit (PMU) 3160 may be implemented to select and execute an optimal low-power state based on a past history at an idle time as described in FIGS. 1 to 13. The power management unit 3160 may be implemented in software, hardware, or firmware. In addition, the power management unit 3160 may enter the processor 3100 into a low-power mode by selecting the optimal low-power state using a neural network.

The memory controller 3200 may be implemented to control storing data received from the processor 3100 in the memory device 3300 and outputting data stored in the memory device 3300 to the processor 3100.

The memory device 3300 may be implemented to store data required in the processor 3100 to perform a neural network operation. For example, one or more neural network models that may be executed by the processor 3100 may be loaded into the memory device 3300. In addition, the memory device 3300 may store input data and output data of the neural network model. The memory device 3300 may include a volatile memory such as dynamic random access memory (DRAM), synchronous DRAM (SDRAM), static RAM (SRAM), and resistive RAM (RRAM), and may include a non-volatile memory such as flash memory.

The term "module" used in this disclosure may refer to a component including one or a combination of two or more of, for example, hardware, software, or firmware. A "module" may be interchangeably used with terms such as, for example, a unit, logic, logical block, component, circuit, or the like. A "module" may be a minimum unit or part of an integrally formed part. A "module" may be a minimal unit or part thereof performing one or more functions. A "module" may be implemented mechanically or electronically. For example, a "module" according to the present disclosure may include at least one of an Application-Specific Integrated Circuit (ASIC) chip, Field-Programmable Gate Arrays (FPGAs), or a programmable-logic device, performing certain operations, known or to be developed in the future.

According to various example embodiments, at least a portion of devices (e.g., modules or functions thereof) or method (e.g., operations) according to the present disclosure may be implemented as an instruction stored in non-transitory computer-readable storage media in a form of, for example, programming modules. When an instruction is executed by one or more processors, the one or more processors may perform a function corresponding to the instruction. The computer-readable storage medium may be, for example, a memory. At least a portion of the programming modules may be implemented by, for example, a processor. At least some of the programming modules may include, for example, modules, programs, routines, sets of instructions or processes for performing one or more functions.

Example embodiments provide a power management policy based on power consumption and a past history for each power state. Example embodiments may estimate and determine a power state that can save the most power when entering the low-power mode. To this end, a quantified number may be used to compare low-power efficiency of each power state. The quantified value according to an example embodiment may be calculated using power consumption, an average entry time, and an entry success rate. For example, the calculation method may be determined as power consumption×(given idle time−average entry consumption time)×entry success rate×correction value. In addition, accuracy may be improved by updating the entry consumption time and entry success rate at each low-power processing. Example embodiments may reduce an entry failure cost and perform post-processing quickly during low-power processing. To this end, a device having a high entry failure probability should be processed first.

Example embodiments update an entry success rate of each device and provides processing priority accordingly. The entry success rate and processing priority are updated for each device's entry success/failure. The low-power state selection method of the OS includes selecting a low-power state based on power consumption in the low-power state and an existing low-power state entry success rate/low-power entry consumption time. A method of selecting an optimal power state based on power consumption, entry consumption time, and entry success rate in the low-power state is used. Accuracy is improved by continuously updating the entry consumption time and entry success rate.

The method of processing each device in the low-power state includes determining and processing a low-power processing sequence based on an existing low-power state entry success rate and set priority for each device. The priority is provided based on the entry success rate for each device. Accuracy is improved by continuously updating the entry success rate and priority.

In a process of processing a low-power state (Idle Time) of the RTOS, an idle time is generated, and a role of managing various programs and managing devices are included in the role of the OS. If an idle time occurs without a program occupying the CPU, the OS may enter a low-power state. This low-power state can be very important for products sensitive to power consumption.

As for selecting the power state, because the idle time occurs in various manners, the logically defined power state may also exist in various manners. Depending on each power state, a configuration of the device may vary. Depending on the situation, a processing process may vary, even in the same device. Accordingly, a time of actual entry may be different each time, and whether or not to enter another power state may also be different.

In order to perform low-power processing of each device, devices to enter a low-power state are processed one by one according to the selected power state. All corresponding devices must be processed in a low-power state to enter the selected power state. If a specific device cannot enter the low-power state, it is impossible to transition to the selected power state, so all devices that have already entered the low-power state must be returned to an original state thereof.

A table may be provided for a history of time consumption until entry and a history of an entry success rate. The table may include two data tables, and each thereof may be updated whenever low-power is entered. The state-specific data table manages power consumption, a minimum holding time, an average entry consumption time, and the number of successes/failures of each state, which is used to calculate and quantify the power consumption of each state. The device-specific data table manages the low-power entry success rate for each device, which is used to determine the low-power processing sequence of each device.

As set forth above, a power management chip, an electronic device including the same, and an operating method thereof according to an example embodiment may efficiently reduce power consumption based on a past history in a low-power state.

A power management chip, an electronic device including the same, and an operating method thereof according to an example embodiment may estimate and select a power state that may save power most when selecting a power state.

A power management chip, an electronic device including the same, and an operation method thereof according to an example embodiment, may compare and quantify a degree of power consumption in consideration of power consumption for each power state, a history of consumption time until low-power entry, and a history of success rate of entering a low-power state.

In a power management chip, an electronic device including the same, and an operating method thereof according to an example embodiment, in a low-power processing operation, by determining a processing sequence of each device, entry failure costs may be minimized and efficient post-processing may be performed.

In some example embodiments, each of the components represented by a block, such as those illustrated in FIGS. 1, 3, 7 and 11-14, may be implemented as various numbers of hardware, software and/or firmware structures that execute respective functions described above, according to embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing operations may employ any number of related art techniques for electronics configuration, signal processing and/or control, data processing and the like.

While aspects of example embodiments have been shown and described above, it will be apparent to those skilled in the art that modifications and variations could be made without departing from the scope as defined by the appended claims.

What is claimed is:

1. An operating method of an electronic device comprising:

generating an idle time corresponding to an idle state;

selecting a low-power state from among a plurality of low-power states based on the idle time and first entries stored in a first table, wherein the first entries include, for at least two of the plurality of low-power states, a time condition, power consumption, a number of successes of entries, a number of failures of entries, and a low-power entry success rate based on the number of successes of entries and the number of failures of entries; and entering each of a plurality of devices into a low-power mode according to the low-power state.

2. The operating method of claim 1, further comprising controlling a processor of the electronic device to implement a low-power management module, wherein the selecting is performed using the low-power management module.

3. The operating method of claim 1, wherein the selecting is performed based on setting information stored in a special function register.

4. The operating method of claim 1, wherein the selecting comprises selecting the low-power state based on overall power consumption, a cumulative low-power entry success rate of each of the plurality of devices, and a low-power consumption time.

5. The operating method of claim 4, further comprising identifying the cumulative low-power entry success rate using the number of successes of entries and the number of failures of entries of each of the plurality of devices in the low-power state.

6. The operating method of claim 1, wherein the electronic device includes the first table and a second table having second data corresponding to each of the plurality of devices according to the low-power state, and wherein the second data indicates priority, the number of successes, the number of failures, and a next entry index.

7. The operating method of claim 6, wherein the entering each of the plurality of devices into the low-power mode further comprises:

identifying a processing sequence of the plurality of devices according to the low-power state; and entering the plurality of devices into the low-power mode according to the processing sequence.

8. The operating method of claim 6, further comprising updating the first table and the second table, after entering the low-power mode.

9. The operating method of claim 1, wherein the entering each of the plurality of devices into the low-power mode comprises preferentially entering a device having a highest entry failure probability, among the plurality of devices, into the low-power mode.

10. The operating method of claim 1, further comprising:
updating an entry failure probability of each of the plurality of devices; and
identifying processing priorities corresponding to the plurality of devices according to the entry failure probability.

11. An electronic device, comprising:
a system-on-chip;
a buffer memory communicably coupled to the-system-on-chip;
a display device configured to display data;
a touch panel configured to generate touch data;
a storage device communicably coupled to the system-on-chip; and
a power management chip configured to:
select a low-power state, from among a plurality of low-power states, based on first entries stored in a first table, wherein the first entries include, for at least two of the plurality of low-power states, power consumption, a history of consumption time, a number of successes of entries, a number of failures of entries, and a low-power entry success rate based on the number of successes of entries and the number of failures of entries, and
sequentially controls each of the system-on-chip, the buffer memory, the display device, the touch panel, and the storage device into a low-power mode according to a sequence corresponding to the low-power state.

12. The electronic device of claim 11, wherein the system-on-chip comprises an accelerator configured to drive a low-power acceleration module to accelerate the low-power mode.

13. The electronic device of claim 11, wherein the power management chip is further configured to determine the sequence based on the low-power entry success rate and priority corresponding to each of the system-on-chip, the buffer memory, the display device, the touch panel, and the storage device.

14. The electronic device of claim 11, wherein the power management chip is disposed inside the system-on-chip.

15. The electronic device of claim 11, wherein the power management chip is further configured to update, after a low-power processing operation:
the first entries corresponding to each of the plurality of low-power states; and
a second table comprising second entries corresponding to each of the system-on-chip, the buffer memory, the display device, the touch panel, and the storage device.

16. A processor, comprising:
a first device;
a second device;
a central processing device; and
a power management circuit configured to:
select a low-power state, from among a plurality of low-power states, based on first entries stored in a first data table, wherein the first entries include, for at least two of the plurality of low-power states, power consumption, average entry consumption time, a number of successes of entries, a number of failures of entries, and a low-power entry success rate in an idle time, wherein the low-power entry success rate is based on the number of successes of entries and the number of failures of entries; and
control a low-power processing operation of the first device, the second device, and the central processing device according to the low-power state.

17. The processor of claim 16, wherein the power management circuit comprises firmware.

18. The processor of claim 16, wherein the power management circuit is further configured to calculate the low-power entry success rate for each of the plurality of low-power states using the number of successes of entries and the number of failures of entries included in the first entries respectively corresponding to the plurality of low-power states and a second data table comprising second entries respectively corresponding to each of the first device and the second device.

19. The processor of claim 16, wherein the power management circuit is further configured to update the entry consumption time and the low-power entry success rate at each low-power processing.

20. The processor of claim 16, wherein the power management circuit is further configured to control the low-power processing operation using a neural network.

* * * * *